O. MEYER.
Molding-Machines.
No. 155,880. Patented Oct. 13, 1874.
fig. 1
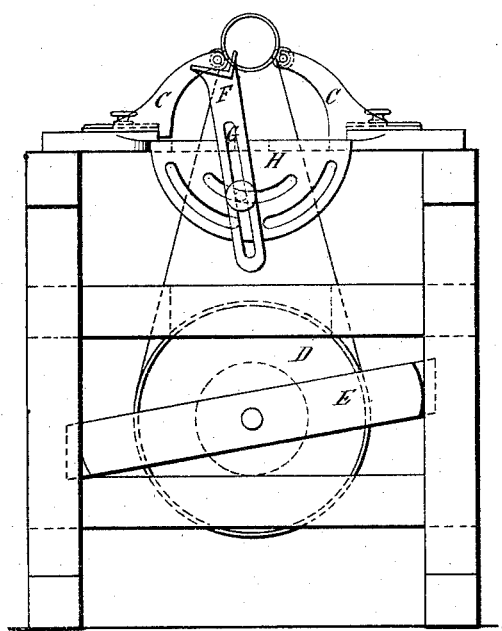
fig. 2
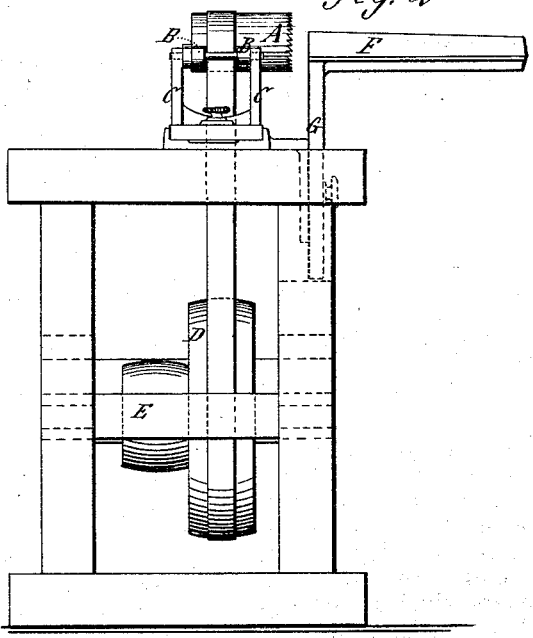
fig. 3
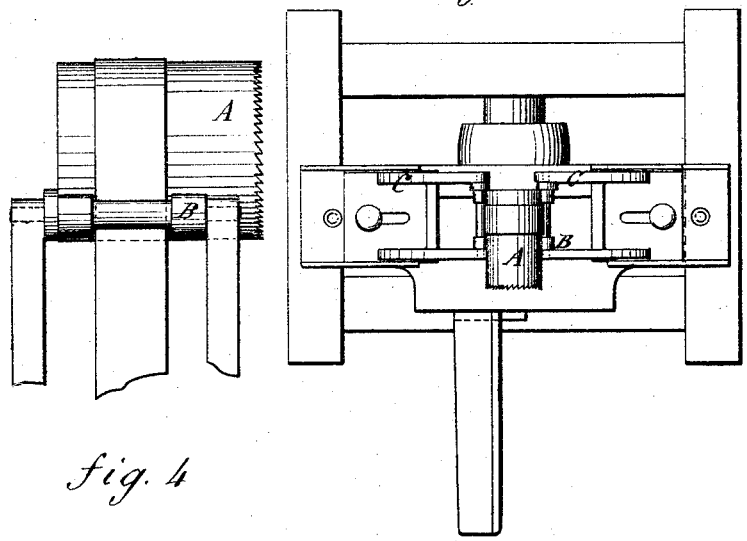
fig. 4
fig. 5
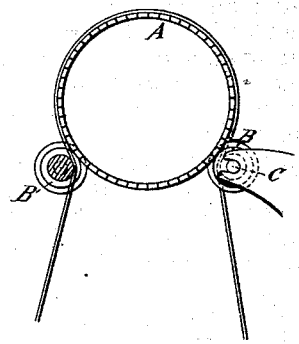
WITNESSES:
E. Neveux
C. Sedgwick
INVENTOR:
O. Meyer
BY Munn & Co.
ATTORNEYS.

UNITED STATES PATENT OFFICE.

OTTO MEYER, OF KANSAS CITY, MISSOURI.

IMPROVEMENT IN MOLDING-MACHINES.

Specification forming part of Letters Patent No. 155,880, dated October 13, 1874; application filed June 20, 1874.

*To all whom it may concern:*

Be it known that I, OTTO MEYER, of Kansas City, Jackson county, Missouri, have invented a new and Improved Molding-Machine, of which the following is a specification:

My invention consists of a barrel-saw mounted on rollers, which are in adjustable supports adapted for shifting readily to suit saws of different sizes for sawing different curves, and an adjustable work-holding table for presenting the work to the saw, by which it is designed to saw moldings to shape with less waste of time than attends the present mode of "sticking" moldings.

The idea is to saw out whole strips in making grooves, and in cutting out corners and the like that may be used for window-stops, beads, and the like, which are now cut into shavings.

Figure 1 is a front elevation of my improved molding-machine. Fig. 2 is a side elevation. Fig. 3 is a plan view. Fig. 4 is a detail of the saw and its supports in side elevation; and Fig. 5 is an elevation of Fig. 4, partly in section.

Similar letters of reference indicate corresponding parts.

A represents the barrel-saw, which is mounted on rollers B, which are in supports C, arranged to slide toward and from each other on the bench to shift them for supporting large or small saws, to make large or small curves, and the driving-pulley D is mounted on a swinging frame, E, which accommodates itself to the belt as it is shortened or lengthened by the saws of different sizes. F represents the work-holding table or guide, which is on a slotted standard, G, to be shifted relatively to the saw, as required, for producing different shapes by sawing out corners, rounding edges, and the like, by clamping it to the slotted plate H in different positions.

I am aware of the Patent No. 63,572, granted to A. E. Stearns April 2, 1867, for a molding-machine, in which a barrel-saw is employed, and I claim nothing therein shown or described.

Having thus described my invention, I claim as new and desire to secure by Letters Patent—

1. The combination of roller-bearings B, barrel-saws A, and adjusting-supports C, as described.

2. The combination of a work-holder, F, arranged to be adjusted as described, with adjustable roller-bearings B and the barrel-saw A, substantially as described.

3. The adjustable pulley-frame, in combination with adjustable roller-bearings B and the barrel-saw, as described.

OTTO MEYER.

Witnesses:
L. G. JEFFERS, Jr.,
D. S. CLARE.